United States Patent [19]
Horovitz

[11] Patent Number: 6,086,968
[45] Date of Patent: Jul. 11, 2000

[54] TWO- AND THREE-DIMENSIONAL SHAPED WOVEN MATERIALS

[76] Inventor: Zvi Horovitz, 21 Marie Dr., Andover, Mass. 01810

[21] Appl. No.: 08/827,663

[22] Filed: Apr. 10, 1997

[51] Int. Cl.[7] .................................. B32B 1/08; D03D 3/00
[52] U.S. Cl. ......................... 428/36.1; 428/36.3; 139/386; 139/387 R
[58] Field of Search ................... 139/384 R, 386, 139/387 R; 428/36.1, 36.3

[56] References Cited
U.S. PATENT DOCUMENTS 5,070,914  12/1991  Fukuta et al. ........................ 139/384 R Primary Examiner—Christopher Raimund
Attorney, Agent, or Firm—Chester A. Bisbee; Perkins, Smith & Cohen

[57] ABSTRACT

This invention discloses woven materials in which the constructed woven materials have a myriad of desired two- and three-dimensional shapes. The invention specifically discloses woven materials that are constructed by continuously varying the density and/or direction of the warp and/or weft fibers or yarns, as well as their angle of contact, at will during the mechanical weaving process. These two- and three-dimensional woven materials can also be used as reinforcers of variously shaped flexible or rigid composite materials.

96 Claims, 2 Drawing Sheets

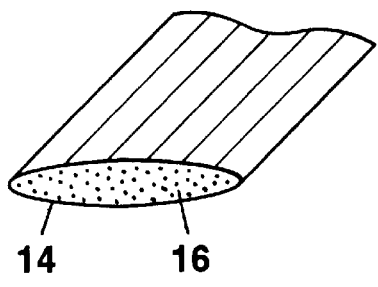
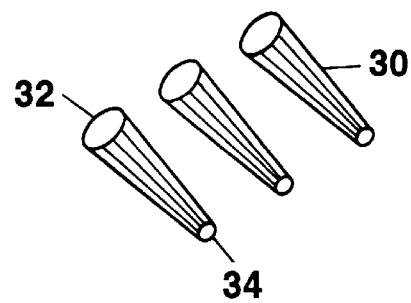
FIG. 5
FIG. 6
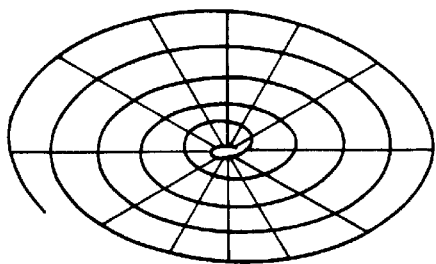
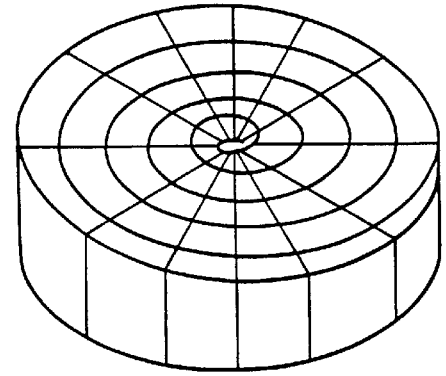
FIG. 7
FIG. 8

TWO- AND THREE-DIMENSIONAL SHAPED WOVEN MATERIALS

BACKGROUND OF THE INVENTION

1. Field of the Invention

The present invention relates to woven materials that have a myriad of desired two- and three-dimensional shapes by virtue of their being constructed by varying the density and/or direction of the warp and/or weft fibers or yarns, as well as their angle of contact, at will during the mechanical weaving process.

2. Description of the Prior Art

The following patent summaries are indicative of the prior art.

In U.S. Pat. No. 5,421,128, there is disclosed a curved inflated, tubular beam consisting of braided fibers and axial fibers on an elastomeric barrier. The construction can be accomplished on a short, straight mandrel. The curvature along the beam can be varied to suit the design needs. The angle of the braid in the bias fibers determines the inflated curvature when axial fibers situated within the braid along the inside of the curvature constrain the elongation on the inside of the curvature. The curved shape can be reinforced by having tape cemented to the outside of the inflated tube. While very small and very large tubes can be perfected for a range of inflation pressures and beam strengths, the preferred embodiment is a 12 and three quarter-inch diameter tube, 60 feet long forming an arch for a tent 30 feet wide and 24 feet high.

In U.S. Pat. Nos. 5,229,177 and 5,082,701, there are disclosed a multi-directional, light-weight, high-strength interlaced material and a method of making the material. This material comprises continuous flat unidirectional flat ribbons, which have been precut from an impregnated fiber reinforced-matrix composite tape so as to have a substantially greater width than thickness, that are interlaced in over-and-under relationship in 0 degree and 90 degree directions into the form of a continuous, multi-directional seamless tube. The tube may be cut into tubular sections, which then are subjected to temporary heat and pressure so that the matrix fuses the interlaced ribbon to form an integral tube. The elongated seamless tube may also be cut into planar sections and used to form integral members of planar or contoured construction. The integral members may be formed of a single layer of the interlaced material, or of laminated construction from multiple layers of interlaced material, with the ribbons of each layer either extending parallel, at an angle other than 0 degrees/90 degrees, aligned, or offset, with respect to the ribbons in the other layer(s). The formed members may have interlaced ribbons of different types and/or contain different types of fibers in different sections of the members, to provide the members with different structural characteristics.

In U.S. Pat. No. 5,070,914, there is disclosed a triaxial textile fabric for use as a reinforcing textile fabric for a composite material wherein the modulus of elasticity is made isotropic and which can be readily deformed into a three-dimensional configuration with out causing special changes in orientation angles and a process by which such a textile fabric can be easily produced. The fabric comprises a large number of oblique yarns extending in a radial direction from the center of the textile fabric, and a circumferential yarn woven spirally in a circumferential direction between the oblique yarns. Each adjacent ones of the oblique yarns are interlaced with each other and the circumferential yarn is woven between the thus interlaced oblique yarns such that such interlacing may appear between each adjacent coils of the spirally woven circumferential yarn. Such an interlacing step takes place after insertion of the circumferential yarn and before an upward and downward movement of the alternate oblique yarns.

Structural members of high strength that are used in various commercial applications have normally been constructed of metal. Recently, both flexible and rigid plastic composite materials have been successfully used as substitutes for metal in these structural members. Even more recently, fibrous manufactured materials, sometimes with a plastic matrix material for fiber bonding, have been used to further reinforce these metal substitutes in high-strength structural members. This substitution has resulted because fiber-reinforced plastic composite materials are lighter, stronger, less expensive, less subject to corrosion, and more impact resistant than traditional metals, such as steel, titanium, and aluminum.

In forming these fiber-reinforced materials, the fibers, or yarns made up of multiple fibers, can be arranged in parallel next to one another, extending longitudinally in one direction. For further structural strength, the resultant material can then be impregnated with a plastic matrix. The resultant material, whether impregnated or not, can then be arranged in layers with the fibers or yarns in these additional layers being oriented in a direction that is different from that of the previous layer. As a result, the fiber-reinforced material can have additional strength.

Unfortunately, the production of these materials is both labor-intensive and expensive. The multiple manufacturing steps involved in making each layer, then overlaying them on each other, as well as the process steps involved in impregnating the materials with plastic matrices, make the overall process costly. In addition, it is difficult to make these materials into the different, complex shapes that are necessary to form structural members of varied design and shape largely because of the stresses and tension placed upon the individual fibers or yarns in the arrays when they are deformed against one another while the shaping process occurs.

As an alternative, the fibers or yarns can be woven into materials that can be used as reinforcement. However, the angle at which these fibers contact each other is severely limited by the manufacturing apparatus with their being no ability to vary the angle of contact throughout the material during an automated manufacturing process. Again, the shapes that can be made by these weaving methods are severely constrained because the limited angle of fiber contact and the stresses and tensions between adjacent and interlaced fibers or yarns do not allow the flexibility necessary to deform the material to a desired shape. In fact, the weaving must normally be done by hand in order to be able to vary the characteristics of the material enough to form the necessary different shapes. Thus, while current weaving techniques can improve the production process somewhat, the manufacture of these materials remains very laborious and far too expensive for anything other than military and commercial aerospace and aircraft applications.

Thus, there exists a need to develop methods that will allow cost-effective, automated manufacture of fiber-reinforced structural members and structures, in general, so that the range of commercial applications to which these materials can be applied is expanded. While the prior art provides some improvements in the manufacturing process for the production of interwoven materials, the limited angle of fiber or yarn contact and the inability to vary this angle at will using the current methods, the inability to continuously vary the widths and densities of the fibers or yarns during automated manufacturing, and the resultant stresses and tensions between adjacent and interlaced fibers or yarns in these materials do not allow the flexibility necessary to deform the interwoven materials into desired shapes. Therefore, the ability to continuously vary the fiber or yarn widths and densities while changing the angle of contact at will during an automated manufacturing process is still lacking in the present state of the art.

Accordingly, it is an object of the present invention to provide a cost-effective method of manufacture of fiber-reinforced structural members and structures, in general. Yet another object of the present invention is to construct an interwoven material in which the angle of contact of the warp and weft fibers or yarns can be continuously varied at will during an automated manufacturing process. Still another object of the present invention is to continuously vary the widths of the fibers or yarns during automated manufacture as desired. A further object of the present invention is to thus continuously vary the densities of the fibers or yarns during manufacture as desired. Yet a further object of the present invention is to be able to efficiently produce interwoven materials of various shapes by automated manufacture that can be used in making structural members and structures, in general.

SUMMARY OF THE INVENTION

The present invention relates to woven materials in which the constructed woven materials have a myriad of desired two- and three-dimensional shapes. These woven materials are constructed by continuously varying the density and/or direction of the warp and/or weft fibers or yarns at will during the mechanical weaving process and by allowing the angle of contact of the warp and weft fibers or yarns to be continuously varied and changed at will during the weaving process. The woven material of the present invention constructed in this manner can be shaped or molded to any desired two- or three-dimensional shape or even woven around any given object. The woven material can then provide reinforcement for the object such that the resulting fiber-reinforced material can be employed to manufacture light-weight, yet strong structural members and structures, in general.

By preparing fiber-reinforced materials in such a manner, the previously noted problems in the prior art of not being able to continuously vary the density and/or direction of the warp and/or weft fibers or yarns at will during the mechanical weaving process while changing their angle of contact at will are overcome. As a result, previously noted problems in the prior art of the form and structure of the fiber-reinforced materials being severely restricted are also overcome. As a result of the development of this invention, manufacturing can be automated. Thus, the invention described herein satisfies the need for a cost-effective, automated process for producing two- and three-dimensional woven materials of varying shapes that can be used in constructing reinforced structural members and structures, in general. These characteristics of fiber-reinforced materials and their component fibers and/or yarns that are described herein make the present invention into one with multiple advantages over the prior art.

Other objects, features, and advantages will be apparent from the following detailed description of preferred embodiments taken in conjunction with the accompanying drawings in which:

BRIEF DESCRIPTION OF THE DRAWINGS

FIG. 5 shows a biconvex, lens-shaped yarn which allows minimal shear between the warp and weft yarns in the woven material.

FIG. 6 shows yarns having one set of ends that are biconvex, lens-shaped and the other set of ends that are circular in shape.

FIG. 7 shows helix and spiral weft fibers in combination with variable density and direction radial warp fibers in a woven material shaped as an end cap.

FIG. 8 shows the end cap of FIG. 7 and a woven material tube, all of which is woven together as one in an automated process.

DETAILED DESCRIPTION OF PREFERRED EMBODIMENTS

The invention described herein is a woven material that is made up of interlaced warp and weft fibers or yarns. The fibers or yarns in either the warp or weft direction are substantially mutually parallel. These fibers or yarns are interwoven together in the warp and weft direction with the angle of contact of the fibers or yarns in these two directions being continuously variable at will during the manufacturing process. In addition, the densities of the fibers or yarns in either the warp or weft direction can be continuously modified at will during manufacture. The individual fibers or yarns can be made of any suitable material that can be manufactured as a fiber or yarn. These fibers and or yarns have minimal bending or kinking along their lengths.

The woven material can be impregnated with matrix material. In the most preferred embodiment, the woven material is impregnated with between 5 and 95 percent matrix material. This matrix can be a thermoset, thermoplastic, or elastomeric material. Examples of thermoset materials are epoxy, polyesters, or vinyl esters. These matrices are hardened through an irreversible catalytic process followed by a curing step. Thermoplastic materials are generally hardened by temperature reduction and, unlike thermoset materials, can be reheated and reformed into different contours. Elastomeric materials generally remain flexible and can result in final two- and three-dimensional woven materials that are flexible.

An automated weaving machine is used to weave fibers or yarns aligned in the warp direction with fibers or yarns aligned in the weft direction in a standard over-and-under interwoven fashion. The angle of intersection of the warp and weft fibers or yarns can be varied at will. In addition, the two- and three-dimensional woven material formed can be used in multiple layers in which the warp and weft directions are either in a parallel orientation or are offset with respect to the closest underlying layer.

Figure 1:
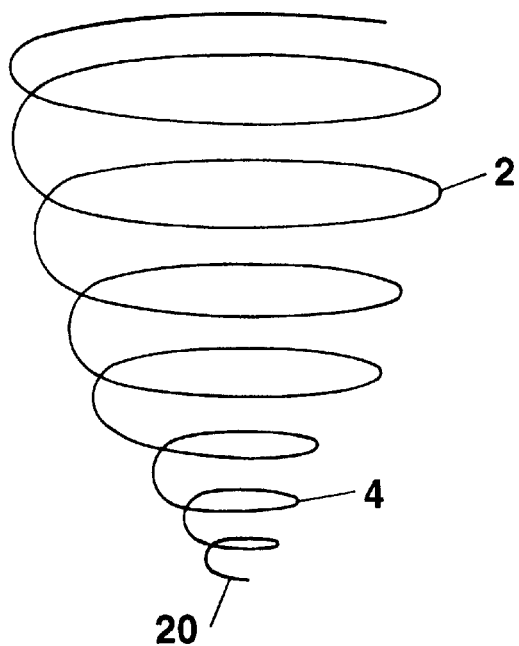
FIG. 1 shows a single helix and spiral weft fiber from a tapered woven material.
Figure 2:
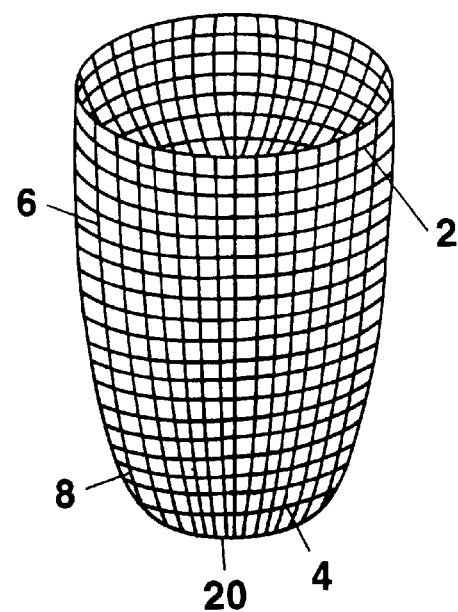
FIG. 2 shows helix and spiral weft fibers in combination with variable density and direction warp fibers in a tapered woven material with an end cap.
Figure 3:
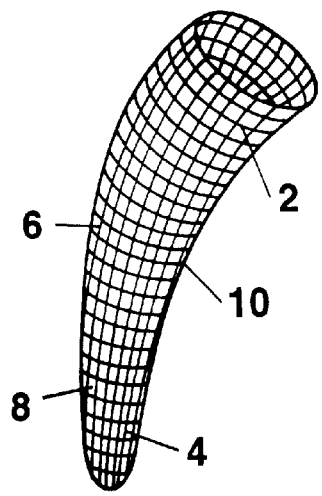
FIG. 3 shows helix and spiral weft fibers in combination with variable density and direction warp fibers in a tapered woven material with an end cap in which the warp fibers on the opposing sides of the circumference of the woven material are of different lengths.

For example, using the methods of the present invention, seamless tubular woven materials can be made with tapered end caps. In FIG. 1, the weft fiber is shown in this type of woven material. It is woven in a helical shape 2 in the body of the tubular woven material and in a helical-spiral shape 4 in the tapered end. In FIG. 2, it is shown that at the same time the warp fiber density can be changed (6 versus 8) to accommodate the reduction in diameter of the woven material at the tapered end 20. Additionally, as shown in FIG. 3, by varying the length of the warp fiber on opposing sides of the circumference of the woven material (6 and 8 versus 10), the curvature of the woven material in the warp fiber direction can also be changed.

The fibers of this invention can also be made into yarns that are then interlaced into a woven material. The yarns of this invention are comprised of individual substantially mutually parallel fibers. The yarns made up of these parallel fibers are generally biconvex or lens-shaped in appearance in cross-section (see FIG. 5); however, they can be shaped as desired in order to conform to the shapes being constructed. For example, FIG. 6 shows weft yarns 30 with one set of ends having a biconvex or lens shape 32 and the other end an almost circular shape 34 due to the variation in warp yarn length on the opposite side of the circumference of the woven material. Additionally, the widths of the yarns can be varied as desired and, as with individual fibers, their densities, direction, and the angle of contact of the warp and weft yarns can be varied at will during manufacturing.

As with woven materials made with individual fibers, the yarns themselves can be impregnated with matrix material. FIG. 5 shows an example of a biconvex or lens-shaped yarn in which the fibers themselves 14 are indicated as well as the matrix material 16. In the most preferred embodiment, yarns are impregnated with between 5 and 95 percent matrix material. This matrix can be a thermoset, thermoplastic, or elastomeric material. Examples of thermoset materials are epoxy, polyesters, or vinyl esters. These matrices are hardened through an irreversible catalytic process followed by a curing step. Thermoplastic materials are generally hardened by temperature reduction and, unlike thermoset materials, can be reheated and reformed into different contours. Elastomeric materials generally remain flexible and can result in final two- and three-dimensional woven materials that are flexible.

As with the individual fibers, an automated weaving machine is used to weave yarns aligned in the warp direction with yarns aligned in the weft direction in a standard over-and-under interwoven fashion. The angle of intersection of the warp and weft yarns can be varied at will. As a consequence of the biconvex or lens shape of the yarns, the edges of the tape yarns can overlap slightly. In addition, the two- and three-dimensional woven material formed from the interwoven yarns can be used in multiple layers in which the warp and weft directions are either in a parallel orientation or are offset with respect to the closest underlying layer.

Fundamentally, the novel feature of this invention is the ability to position and control the warp and weft fibers or yarns, each by itself or both combined, so that the density and length of the fibers or yarns can be varied at will as can their direction and angle of their intersection. The two- and three-dimensional woven materials that can be manufactured using these methods are substantially different from woven materials of the current art in which the warp and weft fibers are of even length and their intersection orthogonal or limited to a precise angle that cannot be varied. The result of this weaving process is a helix and spiral weaving pattern, similar to that of ancient basket weaving, but automated for rapid and cost-efficient manufacturing (see FIGS. 7 and 8).

The two- and three-dimensional woven materials of this invention can be contoured to different shapes, largely as a result of the differing density of the fibers or yarns, the differing widths of the yarns, and the ability to vary the angle of intersection of the warp and weft fibers or yarns at will during manufacture. These woven two- and three-dimensional materials can be contoured such that they are formed into a myriad of differently shaped objects. Also, during the weaving process, the two- and three-dimensional woven materials can be contoured to the shape of an enclosed object.

Figure 4:
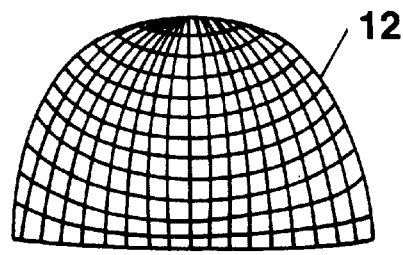
FIG. 4 shows a helmet as an example of a woven material of this invention that has an end cap.

The woven materials envisioned in this invention can be made into a wide variety of structures and containers that can be light weight. Some general examples are structural supports for construction, forms for concrete casting, gas-filled containers for flotation, and storage containers for gasses and liquids at both ambient and elevated pressures or materials that solidify, and high-strength, impact-resistant helmets (see FIG. 4) and ballistic protective materials, in general. Specifically, the containers that can be made using these woven materials can be used as storage containers during land, sea, and air transport of material, protective barriers or flood levees, structural beams and arches, and antennas, lenses, or lens-shaped yarns and structural members for parachutes and parafoils and other like structures in high technology applications, such as the aeronautics and space programs. In all of these applications, these woven fabrics have the advantages of being light weight, flexible, and easily transported, especially as empty containers. The foregoing are meant to be examples only and are not to be taken as limiting the present invention to only these structures.

It will now be apparent to those skilled in the art that other embodiments, improvements, details, and uses can be made consistent with the letter and spirit of the foregoing disclosure and within the scope of this patent, which is limited only by the following claims, construed in accordance with the patent law, including the doctrine of equivalents.

What is claimed is:

1. A woven material comprising:
   (a) a plurality of substantially mutually parallel warp fibers having variable lengths, widths, density, and direction of weaving;
   (b) a plurality of substantially mutually parallel weft fibers having variable lengths, widths, density, and direction of weaving;
   (c) said warp fibers being interlaced with said weft fibers at a variable angle of intersection of the warp and weft fibers;
   (d) said weft fibers being in a helix and spiral configuration; and
   (e) said warp fibers on opposing sides of the circumference of the woven material being of different lengths.

2. The woven material of claim 1 comprising an end cap attached to a woven material tube, all of which is woven together in an automated process.

3. The woven material of claim 1 in which a plurality of layers of said woven material are superimposed on one another and are not offset from one another.

4. The woven material of claim 1 in which a plurality of layers of said woven material are superimposed on one another and are offset from one another.

5. The woven material of claim 1 in which said woven material can be contoured to different shapes.

6. The woven material of claim 1 in which said woven material is shaped to conform to an enclosed object.

7. The woven material of claim 1 in which said woven material is shaped as an end cap.

8. The woven material of claim 1 in which said warp fibers have a right or left turn.

9. The woven material of claim 1 in which said warp fibers have a twist.

10. The woven material of claim 1 in which said warp fibers have a right or left turn and a twist.

11. The woven material of claim 1 comprising a ballistic protective material.

12. The woven material of claim 1 comprising an impact-resistant helmet.

13. The woven material of claim 1 comprising structural supports for construction.

14. The woven material of claim 1 comprising structural beams and arches.

15. The woven material of claim 1 comprising forms for concrete casting.

16. The woven material of claim 1 comprising gas-filled containers for flotation.

17. The woven material of claim 1 comprising storage containers for gasses and liquids at both ambient and elevated pressures.

18. The woven material of claim 1 comprising storage containers for solid materials and materials that solidify.

19. The woven material of claim 1 comprising protective barriers.

20. The woven material of claim 1 comprising flood levees.

21. The woven material of claim 1 comprising antennas.

22. The woven material of claim 1 comprising lenses.

23. A woven material comprising:
   (a) a plurality of substantially mutually parallel warp fibers having variable lengths, widths, density, and direction of weaving;
   (b) a plurality of substantially mutually parallel weft fibers having variable lengths, widths, density, and direction of weaving;
   (c) said warp fibers being interlaced with said weft fibers at a variable angle of intersection of the warp and weft fibers;
   (d) said weft fibers being in a helix and spiral configuration;
   (e) said warp fibers on opposing sides of the circumference of the woven material being of different lengths; and
   (f) said woven material being impregnated with between 5 and 95 percent matrix material.

24. The woven material of claim 23 comprising an end cap attached to a woven material tube, all of which is woven together in an automated process.

25. The woven material of claim 23 in which a plurality of layers of said woven material are superimposed on one another and are not offset from one another.

26. The woven material of claim 23 in which a plurality of layers of said woven material are superimposed on one another and are offset from one another.

27. The woven material of claim 23 in which said woven material can be contoured to different shapes.

28. The woven material of claim 23 in which said woven material is shaped to conform to an enclosed object.

29. The woven material of claim 23 in which said woven material is shaped as an end cap.

30. The woven material of claim 23 in which said warp fibers have a right or left turn.

31. The woven material of claim 23 in which said warp fibers have a twist.

32. The woven material of claim 23 in which said warp fibers have a right or left turn and a twist.

33. The woven material of claim 23 in which said woven material is impregnated with a thermoset matrix material.

34. The woven material of claim 23 in which said woven material is impregnated with a thermoplastic matrix material.

35. The woven material of claim 23 in which said woven material is impregnated with an elastomeric material such that the resulting woven material remains flexible.

36. The woven material of claim 23 comprising a ballistic protective material.

37. The woven material of claim 23 comprising an impact-resistant helmet.

38. The woven material of claim 23 comprising structural supports for construction.

39. The woven material of claim 23 comprising structural beams and arches.

40. The woven material of claim 23 comprising forms for concrete casting.

41. The woven material of claim 23 comprising gas-filled containers for flotation.

42. The woven material of claim 23 comprising storage containers for gasses and liquids at both ambient and elevated pressures.

43. The woven material of claim 23 comprising storage containers for solid materials and materials that solidify.

44. The woven material of claim 23 comprising protective barriers.

45. The woven material of claim 23 comprising flood levees.

46. The woven material of claim 23 comprising antennas.

47. The woven material of claim 23 comprising lenses.

48. A woven material comprising:
   (a) a plurality of substantially mutually parallel warp yarns having variable lengths, widths, density, and direction of weaving;
   (b) a plurality of substantially mutually parallel weft yarns having variable lengths, widths, density, and direction of weaving;
   (c) said warp yarns being interlaced with said weft yarns at a variable angle of intersection of the warp and weft yarns;
   (d) said weft yarns being in a helix and spiral configuration; and
   (e) said warp yarns on opposing sides of the circumference of the woven material being of different lengths.

49. The woven material of claim 48 comprising an end cap attached to a woven material tube, all of which is woven together in an automated process.

50. The woven material of claim 48 in which a plurality of layers of said woven material are superimposed on one another and are not offset from one another.

51. The woven material of claim 48 in which a plurality of layers of said woven material are superimposed on one another and are offset from one another.

52. The woven material of claim 48 in which said woven material can be contoured to different shapes.

53. The woven material of claim 48 in which said woven material is shaped to conform to an enclosed object.

54. The woven material of claim 48 in which said woven material is shaped as an end cap.

55. The woven material of claim 48 in which said warp yarns have a right or left turn.

56. The woven material of claim 48 in which said warp yarns have a twist.

57. The woven material of claim 48 in which said warp yarns have a right or left turn and a twist.

58. The woven material of claim 48 comprising lens-shaped warp and weft yarns.

59. The woven material of claim 48 comprising a ballistic protective material.

60. The woven material of claim 48 comprising an impact-resistant helmet.

61. The woven material of claim 48 comprising structural supports for construction.

62. The woven material of claim 48 comprising structural beams and arches.

63. The woven material of claim 48 comprising forms for concrete casting.

64. The woven material of claim 48 comprising gas-filled containers for flotation.

65. The woven material of claim 48 comprising storage containers for gasses and liquids at both ambient and elevated pressures.

66. The woven material of claim 48 comprising storage containers for solid materials and materials that solidify.

67. The woven material of claim 48 comprising protective barriers.

68. The woven material of claim 48 comprising flood levees.

69. The woven material of claim 48 comprising antennas.

70. The woven material of claim 48 comprising lenses.

71. A woven material comprising:
  (a) a plurality of substantially mutually parallel warp yarns having variable lengths, widths, density, and direction of weaving;
  (b) a plurality of substantially mutually parallel weft yarns having variable lengths, widths, density, and direction of weaving;
  (c) said warp yarns being interlaced with said weft yarns at a variable angle of intersection of the warp and weft yarns;
  (d) said weft yarns being in a helix and spiral configuration;
  (e) said warp yarns on opposing sides of the circumference of the woven material being of different lengths; and
  (f) said woven material being impregnated with between 5 and 95 percent matrix material.

72. The woven material of claim 71 comprising an end cap attached to a woven material tube, all of which is woven together in an automated process.

73. The woven material of claim 71 in which a plurality of layers of said woven material are superimposed on one another and are not offset from one another.

74. The woven material of claim 71 in which a plurality of layers of said woven material are superimposed on one another and are offset from one another.

75. The woven material of claim 71 in which said woven material can be contoured to different shapes.

76. The woven material of claim 71 in which said woven material is shaped to conform to an enclosed object.

77. The woven material of claim 71 in which said woven material is shaped as an end cap.

78. The woven material of claim 71 in which said warp yarns have a right or left turn.

79. The woven material of claim 71 in which said warp yarns have a twist.

80. The woven material of claim 71 in which said warp yarns have a right or left turn and a twist.

81. The woven material of claim 71 in which said woven material is impregnated with a thermoset matrix material.

82. The woven material of claim 71 in which said woven material is impregnated with a thermoplastic matrix material.

83. The woven material of claim 71 in which said woven material is impregnated with an elastomeric material such that the resulting woven material remains flexible.

84. The woven material of claim 71 comprising lens-shaped warp and weft yarns.

85. The woven material of claim 71 comprising a ballistic protective material.

86. The woven material of claim 71 comprising an impact-resistant helmet.

87. The woven material of claim 71 comprising structural supports for construction.

88. The woven material of claim 71 comprising structural beams and arches.

89. The woven material of claim 71 comprising forms for concrete casting.

90. The woven material of claim 71 comprising gas-filled containers for flotation.

91. The woven material of claim 71 comprising storage containers for gasses and liquids at both ambient and elevated pressures.

92. The woven material of claim 71 comprising storage containers for solid materials and materials that solidify.

93. The woven material of claim 71 comprising protective barriers.

94. The woven material of claim 71 comprising flood levees.

95. The woven material of claim 71 comprising antennas.

96. The woven material of claim 71 comprising lenses.

* * * * *